United States Patent
Beuterbaugh et al.

(10) Patent No.: US 11,920,080 B2
(45) Date of Patent: Mar. 5, 2024

(54) PLASTICIZED POLYVINYL ALCOHOL DIVERTER MATERIALS

(71) Applicant: Halliburton Energy Services, Inc., Houston, TX (US)

(72) Inventors: Aaron Michael Beuterbaugh, Spring, TX (US); Larry Steven Eoff, Porter, TX (US); Travis Hope Larsen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/902,673

(22) Filed: Sep. 2, 2022

(65) Prior Publication Data

US 2022/0411689 A1 Dec. 29, 2022

Related U.S. Application Data

(63) Continuation of application No. 16/604,885, filed as application No. PCT/US2017/037725 on Jun. 15, 2017, now Pat. No. 11,466,193.

(51) Int. Cl.
*C09K 8/035* (2006.01)
*C09K 8/508* (2006.01)
(Continued)

(52) U.S. Cl.
CPC ............ *C09K 8/5083* (2013.01); *C09K 8/035* (2013.01); *C09K 8/516* (2013.01); *C09K 8/882* (2013.01); *E21B 43/26* (2013.01)

(58) Field of Classification Search
None
See application file for complete search history.

(56) References Cited

U.S. PATENT DOCUMENTS

| 7,398,826 B2 | 7/2008 | Hoefer et al. |
| 8,030,249 B2 | 10/2011 | Todd et al. |

(Continued)

FOREIGN PATENT DOCUMENTS

| WO | 2006/088603 A1 | 8/2006 |
| WO | 2015/013112 A1 | 1/2015 |

(Continued)

OTHER PUBLICATIONS

International Search Report and Written Opinion issued in related PCT Application No. PCT/US2017/037725 dated Feb. 26, 2018, 14 pages.

(Continued)

*Primary Examiner* — Charles R Nold
(74) *Attorney, Agent, or Firm* — Thomas Rooney; C. Tumey Law Group PLLC

(57) ABSTRACT

Provided are wellbore treatment fluids and methods to introduce these treatment fluids in a subterranean formation. The treatment fluids include a diverter material and an aqueous carrier fluid. Further, the diverter material comprises a composite material of a polyvinyl alcohol and a plasticizer. The diverter material includes particles having a particle size distribution of about 2 to about 10 U.S. mesh and an aspect ratio of 20:1 or less. The treatment fluid is introduced into a permeable zone of a subterranean formation, wherein the permeable zone is part of a wellbore that is permeated or penetrated by fractures and fissures. The diverter material diverts at least partially the treatment fluid to a different portion of the subterranean formation.

20 Claims, 4 Drawing Sheets

(51) Int. Cl.
*C09K 8/516* (2006.01)
*C09K 8/88* (2006.01)
*E21B 43/26* (2006.01)

(56) References Cited

U.S. PATENT DOCUMENTS

| | | | |
|---|---|---|---|
| 2011/0048708 A1 | 3/2011 | Glasbergen et al. | |
| 2014/0116701 A1 | 5/2014 | Tang | |
| 2014/0116702 A1 | 5/2014 | Tang | |
| 2014/0116704 A1* | 5/2014 | Reddy | C09K 8/68 166/300 |
| 2014/0374106 A1* | 12/2014 | Zhu | D01D 5/30 166/305.1 |
| 2015/0315886 A1 | 11/2015 | Potapenko et al. | |
| 2016/0122618 A1* | 5/2016 | Nguyen | C04B 28/021 507/104 |
| 2016/0138370 A1 | 5/2016 | Flores et al. | |
| 2019/0316449 A1 | 10/2019 | Schultz et al. | |

FOREIGN PATENT DOCUMENTS

| | | |
|---|---|---|
| WO | 2015/026355 A1 | 2/2015 |
| WO | 2016/028256 A1 | 2/2016 |
| WO | 2017123937 A1 | 7/2017 |

OTHER PUBLICATIONS

Garlotta, Donald. "A literature review of poly (lactic acid)." Journal of Polymers and the Environment 9.2 (2001): 63-84.
Jimenez, Alfonso, Mercedes Peltzer, and Roxana Ruseckaite, eds. Poly (lactic acid) science and technology: processing, properties, additives and applications. No. 12 Royal Society of Chemistry, 2015.
Priest, "Swelling of Polyvinyl Alcohol in Water" Journal of Polymer Science vol. VI, No. 6, pp. 699-710, 1951. (Year: 1951).
Notice of Allowance for U.S. Appl. No. 16/604,885 dated Jun. 27, 2022.
Final Office Action Summary for U.S. Appl. No. 16/604,885 dated Mar. 15, 2022.
Non Final Office Action Summary for U.S. Appl. No. 16/604,885 dated Sep. 20, 2021.
Final Office Action Summary for U.S. Appl. No. 16/604,885 dated Jun. 24, 2021.
Non Final Office Action Summary for U.S. Appl. No. 16/604,885 dated Apr. 14, 2021.

* cited by examiner

PLASTICIZED POLYVINYL ALCOHOL DIVERTER MATERIALS

BACKGROUND

The present disclosure relates to methods for treating subterranean formations by diverting treatment fluids therein. Diverting agents may be used in a variety of subterranean treatments. Such treatments include, but are not limited to, drilling, stimulation treatments (e.g., fracturing treatments, matrix acidizing treatments), and cementing operations. To ensure the producing zone is contacted by the treating fluid uniformly, a solid diverting agent may be placed in the zone to direct the placement of a desired treatment fluid. The term "zone," as used herein, simply refers to a portion of the formation and does not imply a particular geological strata or composition. One technique has been to pack the diverting agent in perforation tunnels extending from the wellbore into the subterranean zone. The diverting agent in the perforation tunnels causes the treating fluid introduced therein to be uniformly distributed between all of the perforations whereby the subterranean zone is uniformly treated.

For example, in acid stimulation operations, it may be desired to contact less permeable portions of the subterranean formation with the treatment fluid containing an acid so as to achieve the desired stimulation. In other instances, it might be desired to divert a treatment fluid away from certain portions (e.g., water-producing portions) of a subterranean formation entirely so as to treat other portions (e.g., hydrocarbon-producing portions) of the subterranean formation. In scale inhibition operations and clay stabilization operations, it may be desirable to divert the treatment fluid so as to obtain a uniform distribution of the treatment fluid throughout the subterranean formation regardless of the permeability of the particular portion thereof.

Traditional examples of particulate diverting agents are inorganic materials such as rock salts and polymeric materials such as starch, polyesters, and the like. Existing means for diverting treatment fluids for near wellbore (NWB) and far field stimulation applications often comprise polylactic acid, which may be costly and logistically challenging due to storage concerns in high temperature conditions. Additionally, degradation of polylactic acid diverter materials may be less effective at downhole temperatures below 140° F. and the degradation products of polylactic acid are acidic, which may corrode equipment.

BRIEF DESCRIPTION OF THE FIGURES

These figures illustrate certain aspects of some of the embodiments of the present disclosure, and should not be used to limit or define the claims.

Figure 1:
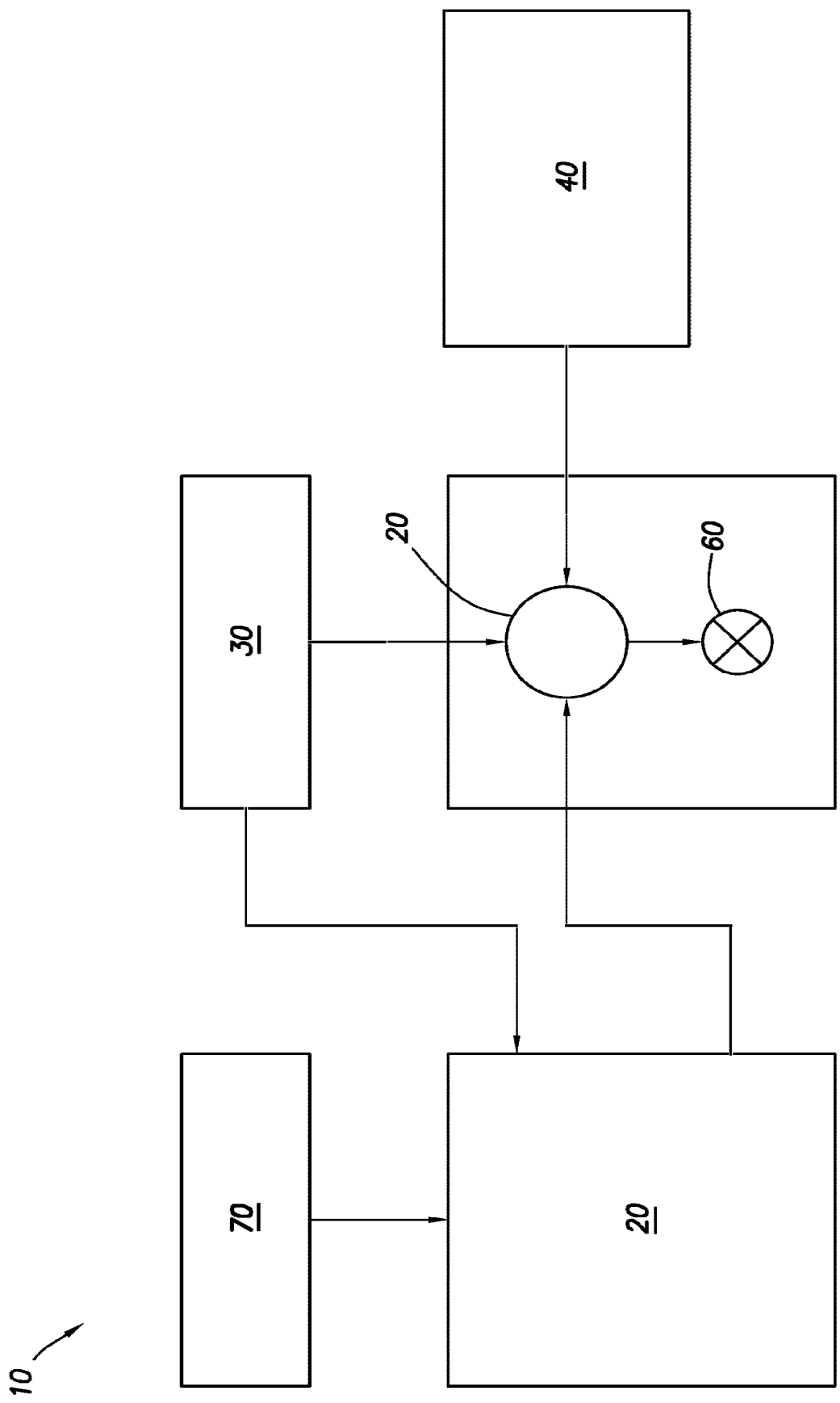
FIG. 1 is a diagram illustrating an example of a system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

As used herein, references to particle sizes of a particular mesh "or larger" and grammatical equivalents thereof refers to particles of that particular mesh size and particles larger than that size. Similarly, as used herein, references to sizes of a particular mesh "or smaller" and grammatical equivalents thereof refers to particles of that particular mesh size and particles smaller than that size.

The present disclosure relates to methods for treating subterranean formations by diverting treatment fluids therein. More particularly, the present disclosure relates to methods for diverting treatment fluids to less permeable zones of subterranean formations using a diverter material comprising a plasticizer and polyvinyl alcohol. As used herein, the term "plasticized PVA diverter material" refers to a composite or mixed material comprising polyvinyl alcohol ("PVA") and a plasticizer. As used herein, the term "permeable zone" refers to a distinct part of a wellbore designated for treatment and/or production that can be permeated or penetrated by liquids or gases, including, but not limited to, fractures and fissures in the subterranean formation, both naturally occurring and artificially created.

The present disclosure provides methods comprising introducing a first diverter material comprising polyvinyl alcohol and a plasticizer into or adjacent to a permeable zone of a subterranean formation; introducing a second diverter material into or adjacent to the permeable zone of the subterranean formation, wherein at least a portion of the first diverter material comprises particles larger than particles of the second diverter material; and allowing the first diverter material and the second diverter material to at least partially divert at least a portion of a treatment fluid to a different portion of the subterranean formation. In some embodiments, the first diverter material may comprise a plasticized PVA diverter material. In certain embodiments, the first diverter material comprises particles sized 6 U.S. mesh or larger. In certain embodiments, the second diverter material comprises particles sized 8 U.S. mesh or smaller. In some embodiments, a second diverter material may be introduced into or adjacent to the permeable zone of the subterranean formation. The second diverter material may be introduced prior to, concurrently with, or subsequent to the introduction of the first diverter material. In some embodiments, additional diverter materials may be introduced. In certain embodiments, the diverter materials may comprise combinations of two or more materials. The diverter material may be combined with a carrier fluid (e.g., an aqueous base fluid) before being introduced into the subterranean formation. In the methods of the present disclosure, the diverter materials of the present disclosure may be introduced into or adjacent to at least a portion of a permeable zone of a subterranean formation. A treatment fluid may then be introduced into the subterranean formation and may be diverted away from the permeable zone by the diverter material to a less permeable zone of the subterranean formation. In some embodiments, a second diverter material may be introduced. In certain embodiments, the first and/or second diverter materials may degrade or dissolve over time after diverting the treatment fluid.

In some embodiments, the present disclosure provides methods of introducing a first treatment fluid comprising an aqueous base fluid and a first diverter material comprising polyvinyl alcohol and a plasticizer into or adjacent to a permeable zone of a subterranean formation, wherein the first diverter material comprises particles sized 6 U.S. mesh or larger; and allowing the first treatment fluid to at least partially divert at least a portion of a second treatment fluid to a different portion of the subterranean formation. In certain embodiments, the present disclosure provides methods of introducing a first diverter composition into or adjacent to a permeable zone of a subterranean formation, wherein the first diverter composition comprises: a first diverter material comprising polyvinyl alcohol and a plasticizer, wherein the first diverter material comprises particles sized 6 U.S. mesh or larger; and a second diverter material comprising particles sized 8 U.S. mesh or smaller; and allowing the diverter composition to at least partially divert at least a portion of a treatment fluid to a different portion of the subterranean formation.

Among the many potential advantages to the methods of the present disclosure, only some of which are alluded to herein, the methods of the present disclosure may allow for more effective diversion of treatment fluids by providing improved diversion, degradation, and/or dissolution performance. In some embodiments, and without being bound by theory, the plasticizer of the present disclosure may allow for larger PVA particles to be formed. In certain embodiments, the plasticized PVA diverter material may swell, allowing for reduced material usage to achieve the same diversion as a non-swellable diverting agent. The plasticized PVA diverter material may dissolve effectively at temperatures of 110° F. or lower, even as low as room temperature. Additionally, in some embodiments, the dissolution products of the plasticized PVA diverter material may be around neutral pH, which may mitigate or avoid certain issues caused by acid-releasing degradable materials used as diverting materials. In certain embodiments, the methods of the present disclosure may permit a plasticized PVA diverter material used to divert a treatment fluid to degrade or dissolve under naturally-occurring conditions of the subterranean formation, and may thus eliminate the need to introduce agents that accelerate the dissolution or degradation process into the subterranean formation.

The plasticized PVA diverter material of the present disclosure may comprise polyvinyl alcohol and a plasticizer. In certain embodiments, the plasticized PVA diverter material is a composite material comprising the PVA and the plasticizer. In certain embodiments, the composite material may comprise additional additives. In certain embodiments, the composite material may consist essentially of PVA and a plasticizer. In some embodiments, the plasticized PVA diverter material may be a solid upon introduction into the wellbore, subterranean formation, and/or permeable zone. In some embodiments, the plasticized PVA diverter material is a solid when it is combined with a treatment fluid prior to introduction to the subterranean formation.

Without being limited by theory, the plasticizer of the plasticized PVA diverter material may stabilize the PVA in the diverter material. In certain embodiments, the plasticizer may reduce the melting point of PVA below its degradation point, allowing for the PVA to be liquefied and processed through an extruder to form larger particles of PVA than is possible without the plasticizer. In some embodiments, the plasticizer may be a surfactant. Plasticizers suitable for certain embodiments of the present disclosure may include, but are not limited to glycol, polyethylene glycol, polypropylene glycol, fatty acid esters, lactide monomers, glycolide monomers, citric acid esters, epoxidized oil, adipate ester, azaleate ester, acetylated coconut oil, and any combination thereof. In some embodiments, the plasticizer may be polyethylene glycol with a molecular weight of from about 2 to about 1200. In some embodiments, the plasticizer may be hydrophobic or hydrophilic. In some embodiments, the plasticizer may be water soluble. In certain embodiments, the plasticizer is not water soluble.

The plasticizer may be present in the plasticized PVA diverter material in an amount sufficient to allow PVA to be extruded and processed to yield larger particles, for example particles sized 4 mesh (U.S. Sieve Series). In some embodiments, the concentration of the plasticizer in the plasticized PVA diverter material may be tuned to affect the dissolution or degradation rate of the plasticized PVA diverter material. In certain embodiments, the plasticizer may be present in an amount of from about 0.1 wt % to about 50 wt % by weight of the plasticized PVA diverter material. In some embodiments, the plasticizer may be present in amount greater than 1 wt %, 5 wt %, 10 wt %, 15 wt %, 20 wt %, 25 wt %, 30 wt %, 35 wt %, 40 wt %, or 45 wt % by weight of the plasticized PVA diverter material. In some embodiments, the plasticizer may be present in an amount of from about 1 wt % to about 30 wt %, from about 5 wt % to about 20 wt %, from about 10 wt % to about 30 wt %, from about 15 wt % to about 30 wt %, all by weight of the plasticized PVA diverter material.

In certain embodiments, the plasticized PVA diverter material (and/or other material with which it is mixed) may be sized to bridge the pore throats, microfractures, or other spaces of a particular region of a subterranean formation, among other reasons, to reduce or prevent fluid loss into the formation matrix and/or to divert the flow of fluid to other (e.g., less permeable) regions of the formation. In certain embodiments, diverter materials of the present disclosure may have particle sizes in a particular range or in several discrete ranges (e.g., as a multimodal material). The plasticized PVA diverter material may have a broad particle size distribution or a narrow particle size distribution. The selection of a suitable particle size distribution for the plasticized PVA diverter material may depend on factors such as the permeability of the formation, the type of formation, the extent of the angle between the natural fractures and manmade fractures therein, and the like. For example, in certain embodiments, the size and/or diameter of the plasticized PVA diverter material may be tailored for a particular application based on, for example, the size of one or more pore throats or fracture width within a subterranean formation in which the plasticized PVA diverter material are to be used, as well as other factors.

In certain embodiments, the plasticized PVA diverter material may comprise particles, an amorphous or other non-particulate material, or a combination thereof. In certain embodiments, the plasticized PVA diverter material and/or plasticized PVA diverter particles may be of any shape (regular or irregular) suitable for a particular application. In some embodiments, the plasticized PVA diverter material (and/or other particulate material with which it is mixed) may have any shape, including, but not limited to, particles having the physical shape of platelets, shavings, flakes, ribbons, rods, strips, spheroids, toroids, stars, sheets, cylinders, beads, cylindrical beads, cubes, pellets, tablets, any other physical shape, and any combination thereof. One of ordinary skill in the art, with the benefit of this disclosure, will recognize the suitable sizes and shapes of the plasticized PVA diverter material for a given application of the present disclosure. In certain embodiments, the aspect ratio of the plasticized PVA diverter material may be about 5:1, 10:1, or 20:1. In some embodiments, the first diverter material may have an aspect ratio of about 20:1 or less, about 10:1 or less, or about 5:1 or less.

In some embodiments, the plasticized PVA diverter material may have a particle size of U.S. mesh size 6 or larger. In some embodiments, the plasticized PVA diverter material may have a particle size of U.S. mesh size 2 or larger. Although some embodiments include no limit to the plasticized PVA diverter material particle size, other embodiments may include a lower size limit or an upper size limit. A lower limit of the size of plasticized PVA diverter material particles according to certain embodiments may be any one of: 80, 70, 60, 50, 40, 35, 30, 25, 20, 18, 16, 14, 12, 10, 8, 7, 6, 5, 4, 3, and 2 U.S. mesh size. In certain embodiments, the plasticized PVA diverter material may have a particle size distribution in the range of about 4 to 6 U.S. mesh; about 2 to 4 U.S. mesh; about 2 to 6 U.S. mesh; about 2 to 8 U.S. mesh; about 2 to 10 U.S. mesh; about 4 to 8 U.S. mesh; about 4 to 10 U.S. mesh; and about 4 to about 12 U.S. mesh. In certain embodiments, the plasticized PVA diverter material may have a particle size of from about 1 mm to about 6.5 mm. In certain embodiments, the plasticized PVA diverter material may have a particle size of about 4 U.S. mesh or larger. One of ordinary skill in the art, with the benefit of this disclosure, will be able to identify a suitable particle size distribution for the plasticized PVA diverter material for a particular application.

In certain embodiments, the particles of the plasticized PVA diverter material may be sized so that the plasticized PVA diverter material will not enter the matrix or pore spaces of the rock present in a subterranean formation. In certain embodiments, the particles of the plasticized PVA diverter material may be sized so that the plasticized PVA diverter material will enter microfractures, fractures and fissures, both naturally occurring and artificially created, within the permeable zone.

In some embodiments, the plasticized PVA diverter material of the present disclosure may absorb an aqueous solution and swell (i.e., expand) as it absorbs the aqueous solution. In certain embodiments, the plasticized PVA diverter material may be hydrophilic and thus may be physically attracted to water molecules. For example, in certain embodiments, the plasticized PVA diverter material may be contacted with an aqueous fluid and may swell as it absorbs the aqueous fluid. In certain embodiments, as the plasticized PVA diverter material undergoes hydration, its volume may increase by about 10 times to about 400 times its original volume. As would be appreciated by those of ordinary skill in the art with the benefit of this disclosure, the amount and rate by which the plasticized PVA diverter material increases in volume may vary depending upon its size, the temperature on the surface, the temperature of the subterranean formation, and the ionic strength of a carrier fluid used to introduce the plasticized PVA diverter material into a subterranean formation. In certain embodiments, the rate of swelling of the plasticized PVA diverter material also may increase as the size of the plasticized PVA diverter material decreases and as the ionic strength of the carrier fluid decreases.

In certain embodiments, the plasticized PVA diverter material may be introduced into a subterranean formation in an effective amount for plugging or partially plugging a permeable zone in the subterranean formation. In certain embodiments, the plasticized PVA diverter material and/or a fluid comprising a plasticized PVA diverter material may at least partially plug off a permeable zone of the subterranean formation, thereby diverting at least a portion of a fluid to less permeable sections of the formation. In some embodiments, the plasticized PVA diverter material may plug or bridge a substantial portion of a permeable zone of the subterranean formation. In certain embodiments, the plasticized PVA diverter material may at least partially bridge a permeable zone. In some embodiments, the plasticized PVA diverter material may divert a fluid so as to obtain a uniform distribution of those fluids throughout the subterranean formation regardless of the permeability of the particular portion thereof. In certain embodiments, the plasticized PVA diverter material may divert fluids away from certain portions (e.g., water-producing portions) of a subterranean formation entirely to treat other portions (e.g., hydrocarbon-producing portions) of the subterranean formation.

In certain embodiments, the plasticized PVA diverter material may undergo dissolution downhole. In certain embodiments, the plasticized PVA diverter material may at least partially dissolve so as to allow increased flow of produced fluids that comprise hydrocarbons from the permeable zone into the wellbore. In certain embodiments, at least a portion of the plasticized PVA diverter material may dissolve into liquid that may be produced back to the surface. In certain embodiments, the dissolution products of the plasticized PVA diverter material have a pH that is about neutral. In some embodiments, the dissolution products of the plasticized diverter material have a pH from about 6 to about 8. In certain embodiments, once dissolved, the plasticized PVA diverter material may be removed from the permeable zone to at least partially unplug the permeable zone without performing any secondary cleanup operations. In certain embodiments, the dissolution of the plasticized PVA diverter material of the present disclosure may occur over a period of time under downhole conditions as a result of the subterranean environment (e.g., temperature, pressure, pH, water content, etc.). In certain embodiments, the first diverter material may at least partially dissolve.

In certain embodiments, dissolution of the plasticized PVA diverter material of the present disclosure may occur at a downhole temperature of the subterranean formation of from about room temperature to about 350° F. In other embodiments, dissolution of the plasticized PVA diverter material of the present disclosure may occur at a downhole temperature of the subterranean formation of about 110° F. or lower, about 120° F. or lower, about 130° F. or lower, or about 140° F. or lower. In some embodiments, dissolution of the plasticized PVA diverter material of the present disclosure may occur at a downhole temperature of the subterranean formation from about 110° F. to about 140° F., from about room temperature to about 350° F., from about room temperature to about 140° F., from about room temperature to about 130° F., from about 110° F. to about 130° F., from about 80° F. to about 200° F., or from about 100° F. to about 130° F. In certain embodiments, dissolution of the plasticized PVA diverter material may occur at a downhole temperature of the subterranean formation around about 110° F.

In certain embodiments, the time period over which substantial dissolution of the plasticized PVA diverter material occurs may vary. In some embodiments, the time period over which dissolution occurs may depend on the downhole temperature of the subterranean formation. In certain embodiments, the rate at which dissolution of the plasticized PVA diverter material occurs may increase as the downhole temperature of the subterranean formation increases. In certain embodiments, dissolution of the plasticized PVA diverter material of the present disclosure may occur over a time period of from about 24 hours to about 14 days. In other embodiments, the dissolution of the plasticized PVA diverter material of the present disclosure may occur over a time period of from about 24 hours to about 168 hours, from about 1 day to about 7 days, from about 1 day to about 14 days, or from about 6 days to about 7 days. In some embodiments, dissolution of the plasticized PVA diverter material of the present disclosure may occur over a time period of less than about 14 days or less than about 7 days. In other embodiments, dissolution of the plasticized PVA diverter material of the present disclosure may occur over a time period of less than 24 hours. In certain embodiments, a crosslinking agent may be combined with the plasticized PVA diverter material before being introduced into the subterranean formation to delay the dissolution of the plasticized PVA diverter material. In some embodiments, a borate crosslinking agent may be combined with the plasticized PVA diverter material before being introduced into the subterranean formation.

According to some embodiments, the plasticized PVA diverter material may be combined with a carrier fluid to form a treatment fluid before being introduced into a subterranean formation. In certain embodiments, the carrier fluid may be used to introduce the plasticized PVA diverter material into or adjacent to a permeable zone of the subterranean formation using one or more pumps. The carrier fluid may be any suitable fluid for moving the plasticized PVA diverter material to desired locations in the subterranean formation. In certain embodiments, the carrier fluid may be an aqueous base fluid. The aqueous base fluids used in accordance with the present disclosure may comprise water from any source. Examples of aqueous base fluids with which the plasticized PVA diverter material may be combined in certain embodiments of the present disclosure include, but are not limited to, fresh water, salt water (e.g., water containing one or more salts dissolved therein), deionized water, brine water of varying salinity, seawater and any combination thereof.

In certain embodiments, the aqueous base fluid may be used to introduce the plasticized PVA diverter material into or adjacent to a permeable zone of the subterranean formation. In certain embodiments, the aqueous base fluid may be mixed with the plasticized PVA diverter material prior to introduction into the subterranean formation. In certain embodiments, the aqueous base fluid may be introduced into the subterranean formation to contact the plasticized PVA diverter material. In certain embodiments, the amount of aqueous base fluid introduced into the subterraneous may be an effective amount for dissolving the plasticized PVA diverter material. In such embodiments, the plasticized PVA diverter material may be introduced into the aqueous base fluid as the aqueous base fluid is being pumped into the wellbore to prevent premature swelling, degradation, or dissolution of the plasticized PVA diverter material. In certain embodiments, the aqueous base fluid may be introduced into the subterranean formation before the plasticized PVA diverter material is introduced.

In certain embodiments, the aqueous base fluid may be of the type that inhibits the swelling of the plasticized PVA diverter material (e.g., calcium chloride brines). In certain embodiments, the salinity of the aqueous base fluid may be increased to reduce the rate at which the plasticized PVA diverter material swells or degrades. In other embodiments, a non-aqueous base fluid may be used to introduce the plasticized PVA diverter material into or adjacent to a permeable zone of the subterranean formation. In such embodiments, the plasticized PVA diverter material will not degrade in the non-aqueous carrier fluid so the plasticized PVA diverter material may be combined with the base fluid before being introduced into the wellbore.

As would be appreciated by those of ordinary skill in the art with the benefit of this disclosure, the effective amount of plasticized PVA diverter material may vary depending on factors such as the type of the carrier fluid, the size of a fracture, fissure, and the like. In certain embodiments, the carrier fluid may comprise the plasticized PVA diverter material in an amount from about 0.01 to about 5.5 pounds of plasticized PVA diverter material per gallon of carrier fluid (ppg). In other embodiments, the carrier fluid may contain the plasticized PVA diverter material in an amount from about 0.01 ppg to about 5 ppg, from about 0.01 ppg to about 4.5 ppg, from about 0.01 ppg to about 4.0 ppg, from about 0.01 ppg to about 3.5 ppg, from about 0.01 ppg to about 3.0 ppg, from about 0.01 ppg to about 2.5 ppg, from about 0.01 ppg to about 2.0 ppg, from about 0.01 ppg to about 1.5 ppg, from about 0.01 ppg to about 1.0 ppg, and from about 0.01 ppg to about 0.5 ppg. In certain embodiments, the carrier fluid may comprise the plasticized PVA diverter material in an amount greater than 0.01, 0.1, 0.5, 1, 1.5, 2, 2.5, 3, 3.5, 4, 4.5, or 5 ppg. In some embodiments, the carrier fluid may comprise the plasticized PVA diverter material in an amount less than 5.5, 5.0, 4.5, 4, 3.5, 3, 2.5, 2, 1.5, 1, 0.5, or 0.1 ppg. In certain embodiments, the carrier fluid containing the plasticized PVA diverter material may remain sufficiently non-viscous in order to allow it to be placed in the permeable areas of the subterranean formation. Thus, there may be no need to apply higher pressure that could damage the rock structure surrounding the subterranean formation in an attempt to force the plasticized PVA diverter material into the permeable areas.

In certain embodiments, a treatment fluid may be introduced into the subterranean formation and diverted by the plasticized PVA diverter material of the present disclosure. The treatment fluids that may be useful in accordance with the present disclosure may be used to carry out a variety of subterranean treatments, including, but not limited to, hydraulic fracturing treatments, acidizing treatments, and drilling operations. The treatment fluids of the present disclosure may be used in treating a portion of a subterranean formation, for example, in acidizing treatments such as matrix acidizing or fracture acidizing. Acidizing and fracturing procedures using acidic treatment fluids may be carried out in subterranean formations to accomplish a number of purposes including, but not limited to, to facilitate the recovery of desirable hydrocarbons from the formation.

Depending on the type of treatment to be performed, the treatment fluid may comprise any treatment fluid known in the art. Treatment fluids that may be useful in accordance with the present disclosure include, but are not limited to, fracturing fluids, gravel packing fluids, pre-pad fluids, pad fluids, preflush fluids, afterflush fluids, acidic fluids, consolidation fluids, cementing fluids, wellbore clean-out fluids, conformance fluids, aqueous fluids (e.g., fresh water, salt water, brines, etc.), non-aqueous fluids (e.g., mineral oils, synthetic oils, esters, etc.), hydrocarbon-based fluids (e.g., kerosene, xylene, toluene, diesel, oils, etc.), foamed fluids (e.g., a liquid that comprises a gas), gels, emulsions, gases, and the like.

The treatment fluids that may be useful in accordance with the present disclosure may comprise any base fluid known in the art, including, but not limited to, aqueous fluids, non-aqueous fluids, and any combinations thereof. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art with the benefit of this disclosure will recognize when such density and/or pH adjustments are appropriate. Examples of non-aqueous fluids that may be suitable for use in the methods of the present disclosure include, but are not limited to, oils, hydrocarbons, organic liquids, and the like. In certain embodiments, the treatment fluids may comprise a mixture of one or more fluids and/or gases, including but not limited to emulsions, foams, and the like.

In certain embodiments, the treatment fluids and/or carrier fluids used in the methods of the present disclosure optionally may comprise any number of additional additives. Examples of such additional additives include, but are not limited to, salts, surfactants, acids, chelating agents, proppant particulates, microproppant particulates, additional diverter materials, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, $H_2S$ scavengers, $CO_2$ scavengers, oxygen scavengers, lubricants, additional viscosifiers, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to a treatment fluid and/or carrier fluid. A person skilled in the art with the benefit of this disclosure will recognize the types of additives that may be included in the fluids of the present disclosure for a particular application.

In certain embodiments, additional diverter materials may be introduced into the subterranean formation. Any suitable diverter material known in the art may be used along with the plasticized PVA diverter material. In certain embodiments, the methods of the present disclosure may comprise introducing a second diverter material into or adjacent to a permeable zone of a subterranean formation. In certain embodiments, the second diverter material may be introduced into the same portion of the subterranean formation as the first diverter material. In some embodiments, the second diverter material may be introduced into a different portion of the subterranean formation as the first diverter material. In some embodiments, a diverter composition may comprise a plasticized PVA diverter material and a second diverter material. Any suitable diverting agent may be used as the second diverter material. Second diverter materials suitable for certain embodiments of the present disclosure include polyvinyl alcohol, calcium carbonate, polyglycolic acid, polylactic acid, and any combination thereof. In some embodiments, the second diverter material may comprise PVA. In some embodiments, the second diverter material may consist essentially of PVA. In certain embodiments, the second diverter material may not comprise a substantial amount of a plasticizer. In some embodiments, the second diverter material consists essentially of PVA.

The second diverter material may be introduced prior to, concurrently with, and/or subsequent to the introduction of the plasticized PVA diverter material. In certain embodiments, the second diverter material may be introduced in the same carrier fluid as the plasticized PVA diverter material or in a different carrier fluid. In some embodiments, the second diverter material may at least partially divert fluid to a different portion of the subterranean formation. In certain embodiments, the second diverter material may plug or partially plug a permeable zone. In some embodiments, the second diverter material may degrade in the formation. In certain embodiments, the second diverter material may at least partially degrade in the formation. In certain embodiments, the second diverter material may degrade into liquid that may be produced back to the surface. In certain embodiments, the degradation products of the second diverter material have a pH that is about neutral. In certain embodiments, once degraded, the second diverter material may be removed from the permeable zone to at least partially unplug the permeable zone without performing any secondary cleanup operations. In certain embodiments, the degradation of the second diverter material of the present disclosure may occur over a period of time under downhole conditions as a result of the subterranean environment (e.g., temperature, pressure, pH, water content, etc.).

In certain embodiments, the second diverter material may be in a particulate form. In some embodiments, the second diverter material may comprise particles from about 1 micron to about 3400 microns or from about 1 micron to about 2000 microns. In certain embodiments, the second diverter material may comprise particles with a diameter of less than 3400, 3000, 2500, 2000, 1500, 1000, 500, 400, 300, 200, or 100 microns. In certain embodiments, the second diverter material may comprise particles with a diameter of less than 2000 microns. In some embodiments, the second diverter material may comprise particles of U.S. mesh size 6 or smaller. In some embodiments, the size of the second diverter material particles may be U.S. mesh size 8 or smaller. An upper limit of the size of second diverter material particles according to various embodiments may be any one of: 80, 70, 60, 50, 40, 35, 30, 25, 20, 18, 16, 14, 12, 10, 8, 7, 6, and 4 U.S. mesh size. In certain embodiments, the second diverter material may be sized in any one or more of the following size ranges: about 6 to about 100 U.S. mesh; about 6 to about 140 U.S. mesh; about 10 to about 100 U.S. mesh; about 10 to about 140 U.S. mesh; about 6 to about 400 U.S. mesh; about 6 to about 400 U.S. mesh; about 10 to about 400 U.S. mesh; and about 10 to about 400 U.S. mesh. In some embodiments, the first diverter material comprises particles larger than the second diverter material. In certain embodiments, the first diverter material comprises particles substantially larger than the second diverter material.

Examples of commercially available PVA particles suitable for certain embodiments of the present disclosure include, but are not limited to Selvol™ 103 and 425 (available from Sekisui Specialty Chemicals, Dallas, Texas) and Kuraray Poval® 3-98 (available from Kuraray America Inc., Houston, Texas).

In some embodiments, a diverter composition comprises a first diverter material and a second diverter material. In certain embodiments, a diverter composition may be mixed with a carrier fluid prior to introduction into the permeable zone. In certain embodiments, the carrier fluid may comprise the diverter composition in an amount from about 0.01 to about 5.5 pounds of diverter composition per gallon of carrier fluid (ppg). In other embodiments, the carrier fluid may contain the diverter composition in an amount from about 0.01 ppg to about 5 ppg, from about 0.01 ppg to about 4.5 ppg, from about 0.01 ppg to about 4.0 ppg, from about 0.01 ppg to about 3.5 ppg, from about 0.01 ppg to about 3.0 ppg, from about 0.01 ppg to about 2.5 ppg, from about 0.01 ppg to about 2.0 ppg, from about 0.01 ppg to about 1.5 ppg, from about 0.01 ppg to about 1.0 ppg, from about 0.01 ppg to about 0.5 ppg. In certain embodiments, the carrier fluid may comprise the diverter composition in an amount greater than 0.01, 0.1, 0.5, 1, 1.5, 2, 2.5, 3, 3.5, 4, 4.5, or 5 ppg. In some embodiments, the carrier fluid may comprise the diverter composition in an amount less than 5.5, 5.0, 4.5, 4, 3.5, 3, 2.5, 2, 1.5, 1, 0.5, or 0.1 ppg.

In certain embodiments, the plasticized PVA diverter material may comprise from about 0.1 to about 100% by weight of the diverter composition. In some embodiments, the second diverter material may comprise from about 0.1 to about 100% by weight of the diverter composition. The ratio of plasticized PVA diverter material to the second diverter material in the diverter composition may, in certain embodiments, be about 10:90, 20:80, 30:70, 40:60, 50:50, 60:40, 70:30, 80:20, or 90:10. In some embodiments, the diverter composition comprises about 35 percent plasticized PVA diverter material.

In some embodiments, the present disclosure provides methods and systems that may be used in carrying out a variety of subterranean operations, including, but not limited to drilling operations, workover operations, cementing operations, completions operations, stimulation operations (e.g., hydraulic fracturing treatments or acidizing treatments), wellbore clean-up operations, and the like. The methods and systems of the present disclosure also may be used during periods when hydrocarbons or other fluids are being produced from a subterranean formation and/or wellbore. The wellbores in which the methods and systems of the present disclosure may be used may be cased holes or open holes, as well as partially cased or partially open holes. The wellbores also may be vertical wellbores or may comprise portions that are deviated or horizontal to any degree.

In certain embodiments, stages of diverter compositions comprising plasticized PVA diverter material may be introduced into a subterranean formation in the course of fracturing and/or re-fracturing treatments in certain regions or zones in the formation, among other reasons, to selectively treat certain regions and/or facilitate more uniform stimulation of different regions of the formation having different permeabilities.

In other embodiments, a diverter composition comprising plasticized PVA diverter material may be introduced into other regions of a formation (e.g., other than perforations in a wellbore casing) to form a plug therein. Such plugs comprising plasticized PVA diverter material may isolate a particular portion of a wellbore or subterranean formation, among other reasons, in order to allow for selective treatment of other areas, or to prevent the flow of fluids from one area of a formation to another. These plugs may be useful in many different types of subterranean operations, including those listed above.

For example, and with reference to FIG. 1, the disclosed methods may directly or indirectly affect one or more components or pieces of equipment associated with a stimulation system 10, according to one or more embodiments. In certain embodiments, the system 10 includes a fluid producing apparatus 20, a fluid source 30, a diverter composition source 40, and a pump and blender system 50 and resides at the surface at a well site where a well 60 is located. The fluid can be a fluid for ready use in a treatment of the well 60. In other embodiments, the fluid producing apparatus 20 may be omitted and the fluid sourced directly from the fluid source 30.

The diverter composition source 40 can include a diverter composition for combination with a fluid. The system 10 may also include additive source 70 that provides one or more additives (e.g., bridging agents, gelling agents, weighting agents, and/or other optional additives) to alter the properties of the fluid. For example, the other additives 70 can be included to reduce pumping friction, to reduce or eliminate the fluid's reaction to the geological formation in which the well is formed, to operate as surfactants, and/or to serve other functions. In some embodiments, the plasticized PVA diverter material of the present disclosure may be introduced into a fluid via the diverter composition source 40 or the additive source 70.

The pump and blender system 50 may receive the fluid and combine it with other components, including a diverter composition from the diverter composition source 40 and/or additional components from the additives source 70. In certain embodiments, the resulting mixture may be pumped down the well 60 at a pressure suitable to introduce the fluid into one or more permeable zones in the subterranean formation. In certain instances, the fluid producing apparatus 20, fluid source 30, and/or diverter composition source 40 may be equipped with one or more metering devices or sensors (not shown) to control and/or measure the flow of fluids, proppants, diverters, bridging agents, and/or other compositions to the pumping and blender system 50. In certain embodiments, the metering devices may permit the pumping and blender system 50 to source from one, some, or all of the different sources at a given time, and may facilitate the preparation of fluids in accordance with the present disclosure using continuous mixing or "on-the-fly" methods. Thus, for example, the pumping and blender system 50 can provide just fluid into the well at some times, just additives at other times, and combinations of those components at yet other times.

While not specifically illustrated herein, the disclosed methods and systems may also directly or indirectly affect any transport or delivery equipment used to convey wellbore compositions to the system 50 such as, for example, any transport vessels, conduits, pipelines, trucks, tubulars, and/or pipes used to fluidically move compositions from one location to another, any pumps, compressors, or motors used to drive the compositions into motion, any valves or related joints used to regulate the pressure or flow rate of the compositions, and any sensors (e.g., pressure and temperature), gauges, and/or combinations thereof, and the like.

Figure 2:
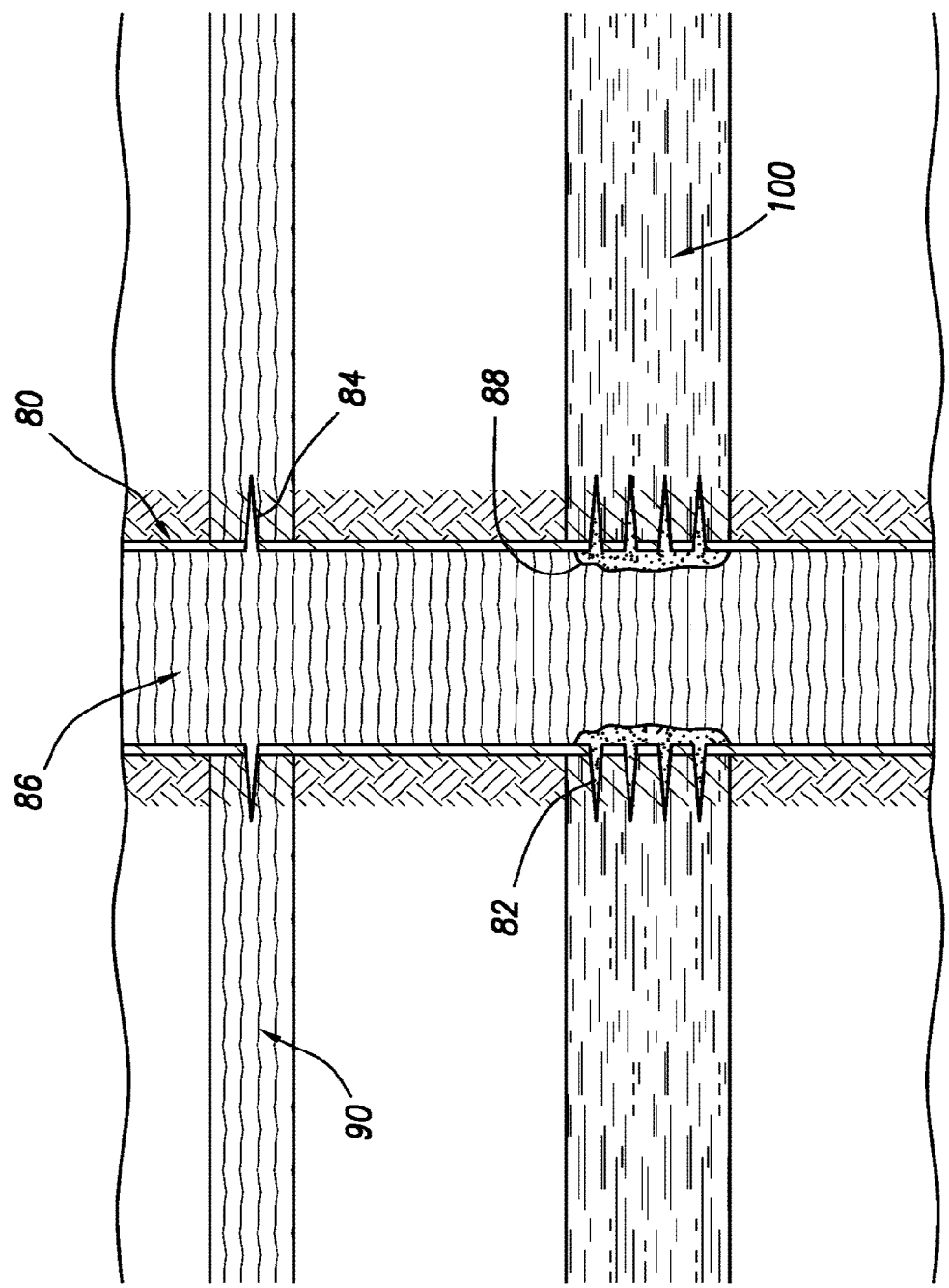
FIG. 2 is a diagram illustrating an example of a subterranean formation penetrated by a wellbore in which a treatment fluid may be diverted from one permeable zone to another permeable zone using a diverter material of the present disclosure.

FIG. 2 shows a side view of a subterranean formation penetrated by a wellbore with a casing string 80 placed in the wellbore. The wellbore penetrates two zones 90 and 100 in the subterranean formation, wherein the fluid flow resistance of zone 90 is higher than the fluid flow resistance of zone 100. Perforations 82, 84 have been created in the casing string 80 to allow for fluid flow into the zones 90 and 100. In certain embodiments, a plasticized PVA diverter material 88 of the present disclosure may be introduced into at least a portion of the perforations 82 within zone 100 or adjacent to a least a portion of zone 100 of the subterranean formation using one or more pumps. Once the plasticized PVA diverter material 88 is introduced into the subterranean formation, an aqueous fluid may be introduced into the subterranean formation to contact the plasticized PVA diverter material 88. In certain embodiments, the introduction of the plasticized PVA diverter material 88 and the introduction of the aqueous fluid may be reversed such that the aqueous fluid is first introduced into at least a portion of zone 100 followed by the plasticized PVA diverter material 88. In other embodiments, the aqueous base fluid may be a carrier fluid such that the plasticized PVA diverter material 88 and the aqueous fluid are introduced into at least a portion of zone 90 simultaneously.

Once introduced into the wellbore, the plasticized PVA diverter material 88 may plug or partially plug zone 100. A treatment fluid 86 may then be introduced into the wellbore and diverted by the plug or partial plug of the plasticized PVA diverter material 88 to the less permeable zone 90 of the subterranean formation. The treatment fluid 86 may be allowed to interact with the less permeable zone 90 of the subterranean formation.

After diverting the treatment fluid, the plug or partial plug of the plasticized PVA diverter material 88 may degrade over time at a naturally occurring downhole temperature of the subterranean to at least partially unplug zone 100 without having to perform secondary cleanup operations. In another embodiment, this diverting procedure may be repeated with respect to each of a second, third, fourth, or more, treatment stages to divert the treatment fluid to further less permeable zones of the subterranean formation.

Additives may be incorporated into the diverter compositions of various embodiments by any suitable means. For example, additives may be dry blended with the diverter composition before the addition of a fluid such as water, by mixing with the fluid to be added to the diverter composition, or by mixing with the diverter composition consecutively with, or after, the addition of the fluid. In some embodiments, additives may be pre-suspended in water and injected into the diverter composition fluid or into the diverter composition slurry as an aqueous slurry. In certain embodiments, liquid additives (or suspended additives, as noted) may be mixed with a fluid such as water; solid additives may be mixed with the diverter composition; and then the fluid and diverter composition (plus respective additives mixed therewith) may be mixed together to form a pumpable slurry. Examples of liquid additives suitable in certain embodiments of the present disclosure may include set retarders, accelerants, surfactants, fluid loss control additives, and dispersants. In some embodiments, any one or more of these liquid additives may be employed in solid form instead of or in addition to their liquid form. Further examples of solid additives may include rubber particles, carbon fibers, microspheres, and weighting materials.

The diverter compositions, diverter materials, and fluids of the present disclosure may be prepared using any suitable method and/or equipment (e.g., blenders, mixers, stirrers, etc.) known in the art at any time prior to their use. The diverter compositions may be prepared at least in part at a well site or at an offsite location. In certain embodiments, the aqueous base fluid may be mixed with the plasticized PVA diverter material, and/or other components at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the diverter compositions, plasticized PVA diverter materials, and fluids of the present disclosure may be prepared, either in whole or in part, at an offsite location and transported to the site where the treatment or operation is conducted. In introducing a fluid or diverter material into a portion of a subterranean formation, the components may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

The exemplary diverter compositions and diverter materials disclosed herein may directly or indirectly affect one or more components or pieces of equipment associated with the preparation, delivery, recapture, recycling, reuse, and/or disposal of the disclosed diverter compositions and materials. For example, the disclosed compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the compositions. The disclosed compositions may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

Example 1

The following example demonstrates the degradability of a plasticized PVA diverter material (Selvol™ 103 with plasticizer and Selvol™ 425 with plasticizer) over time compared to other diverter materials (a polylactic acid ("PLA") diverter material, and Selvol™ 103 without a plasticizer). The plasticized PVA diverter materials were cylindrical beads with a size of from about 4 to about 6 U.S. mesh. The non-plasticized Selvol™ 103 had a particle size distribution of about 16 mesh and smaller. The PLA diverter material, FDP-S1248-16, had a multi-modal particle size distribution ranging from 100 to 3400 microns.

To start, 0.5 grams of each diverter material was added to 100 mL of Houston tap water. The mixtures were then placed in a heated water bath at 110° F. and allowed to age. After seven days (168 hours), the diverter material was filtered, rinsed, and placed in a 160° F. oven overnight. The dried sample was weighed and a mass balance was calculated based on the starting mass to determine the amount of weight loss. The results are shown in Table 1.

TABLE 1

| Material | Mass in 100 mL of Tap Water (g) | Temp (° F.) | Hours | % Degraded |
|---|---|---|---|---|
| FDP-S1248-16 | 0.5 | 110 | 168 | 9 |
| Selvol ™ 103 | 0.5 | 110 | 168 | 44 |
| Selvol ™ 103 Beads with plasticizer | 0.5 | 110 | 168 | 66 |
| Selvol ™ 425 Beads with plasticizer | 0.5 | 110 | 168 | 67 |

As shown in Table 1, the plasticized PVA diverter materials (Selvol™ 103 with plasticizer and Selvol™ 425 with plasticizer) displayed a more rapid degradation profile over 7 days than the non-plasticized PVA of a smaller particle size (Selvol™ 103) and the PLA diverter material. Without being limited by theory, the faster degradation rate of the plasticized PVA may be attributed to the increased water solubility of the plasticizer.

Example 2

The following example shows the diversion performance of a diverter composition comprising 10% plasticized Selvol™ 103 PVA diverter material and 90% non-plasticized PVA (Kuraray Poval® 3-98 PVA) compared to the diversion performance of a PLA diverter material (FDP-S1248-16). The plasticized Selvol™ 103 was cylindrical beads with a size of from about 4 to about 6 U.S. mesh. The non-plasticized PVA (Kuraray Poval® 3-98 PVA) had a particle size distribution of about 16 mesh and smaller. The PLA diverter material, FDP-S1248-16, had a multi-modal particle size distribution ranging from 100 to 3400 microns.

A FANN HPHT Filter Press apparatus was used to measure diversion performance in a 2032 μm slot. The cell was pre-warmed to the testing temperature (130° F.) and loaded with each diverter material. The diverter material was suspended in a 30# WG-38 (diutan) fluid to minimize particle settling during fluid heating times and during the test. The fluid loss test was initiated and displacement fluid (color dyed 30# WG-38) was pumped with an ISCO dual piston pump set to constant pressure flow regime with a set rate limit of 24 mL/min. Pressure (psi) and pump rate (mL/min) were measured as a function of time. The test was run until either 500 psi was achieved and the pump rate dropped to less than 1 mL/min or the colored dye was noted in the effluent.

Figure 3:
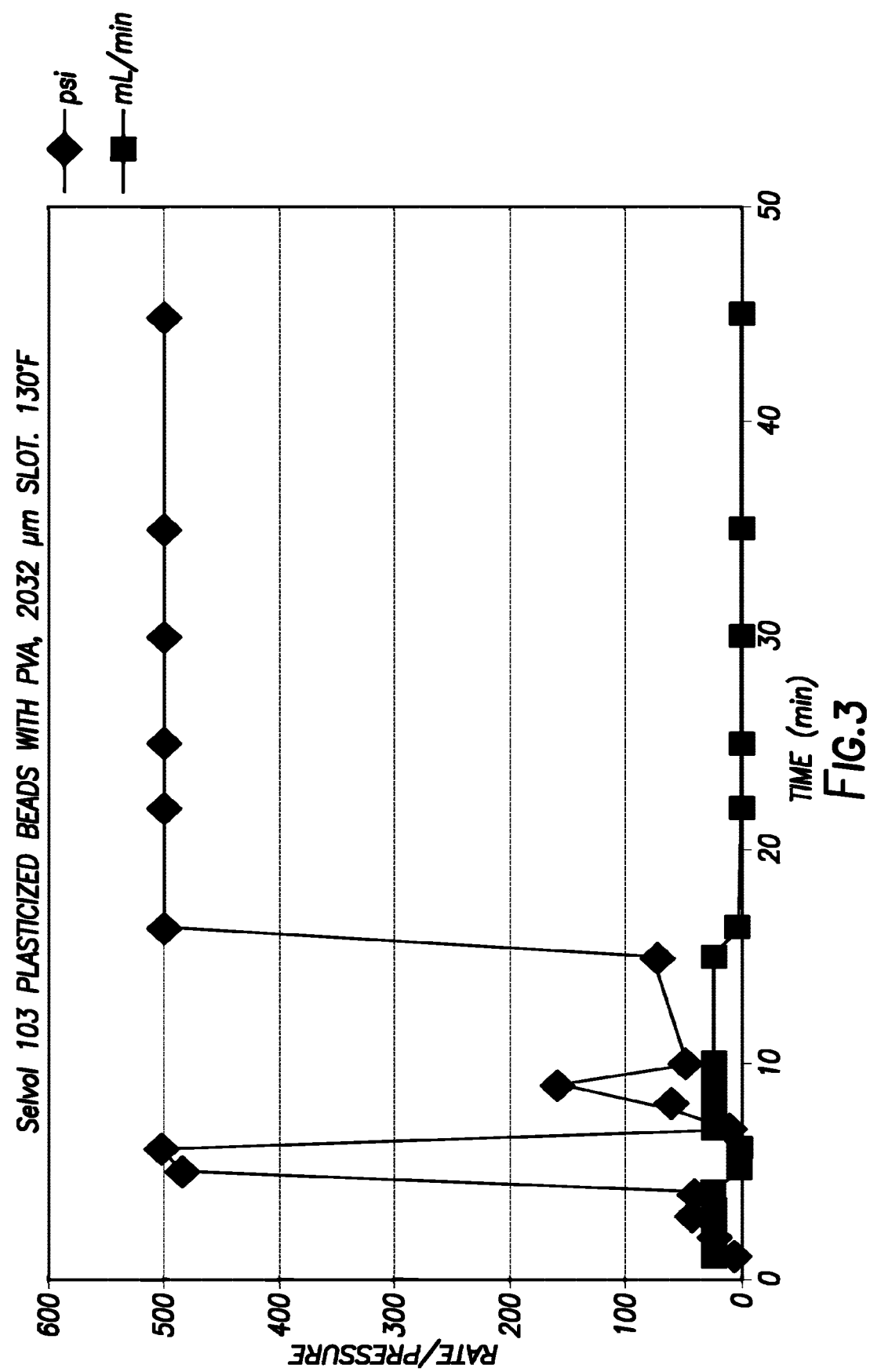
FIG. 3 is a graph illustrating data regarding flow rate and pressure versus time for the simulation of a composition plugging a loss zone in accordance with certain embodiments of the present disclosure.
Figure 4:
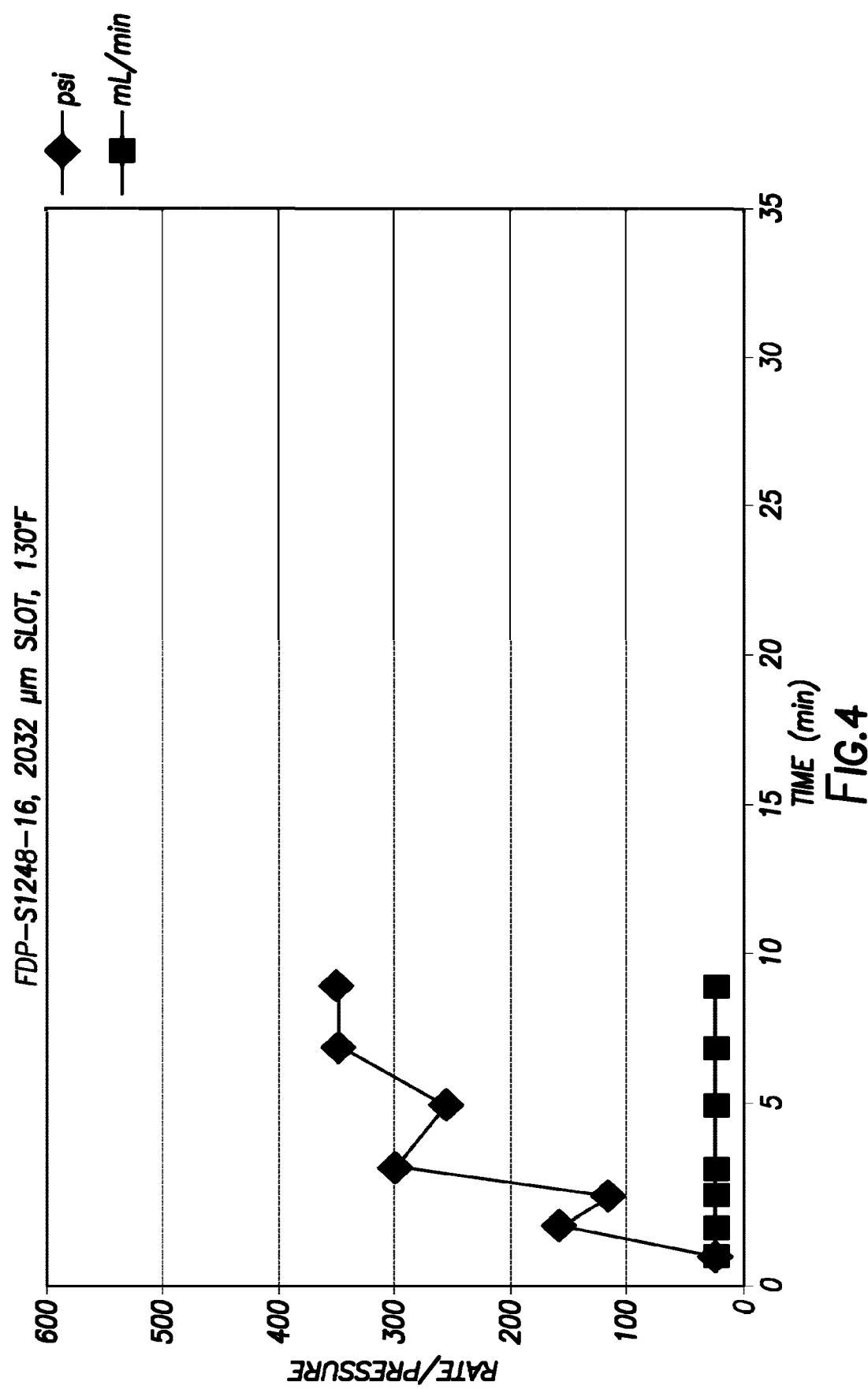
FIG. 4 is a plot illustrating data regarding flow rate and pressure versus time for the simulation of a composition plugging a loss zone in accordance with certain embodiments of the present disclosure.

FIGS. 3 and 4 show the results. As shown in FIGS. 3 and 4, the diverter composition comprising plasticized PVA diverter material, even at a 10% bead loading, in combination with a commercial PVA, out-performed the PLA divertering material, FDP-S1248-16, which contains about 35% beads. This demonstrates the efficacy of a plasticized PVA for sealing off a slot/fracture, and emphasizes the importance of large particles for initiating bridging of the slot.

An embodiment of the present disclosure is a method comprising: introducing a first diverter material comprising polyvinyl alcohol and a plasticizer into or adjacent to a permeable zone of a subterranean formation; introducing a second diverter material into or adjacent to the permeable zone of the subterranean formation, wherein at least a portion of the first diverter material comprises particles larger than particles of the second diverter material; and allowing the first diverter material and the second diverter material to at least partially divert at least a portion of a treatment fluid to a different portion of the subterranean formation.

Another embodiment of the present disclosure is a method comprising: introducing a first treatment fluid comprising an aqueous base fluid and a first diverter material comprising polyvinyl alcohol and a plasticizer into or adjacent to a permeable zone of a subterranean formation, wherein the first diverter material comprises particles sized 6 U.S. mesh or larger; and allowing the first treatment fluid to at least partially divert at least a portion of a second treatment fluid to a different portion of the subterranean formation.

Another embodiment of the present disclosure is a method comprising: introducing a first diverter composition into or adjacent to a permeable zone of a subterranean formation, wherein the first diverter composition comprises: a first diverter material comprising polyvinyl alcohol and a plasticizer, wherein the first diverter material comprises particles sized 6 U.S. mesh or larger; and a second diverter material comprising particles sized 8 U.S. mesh or smaller; and allowing the diverter composition to at least partially divert at least a portion of a treatment fluid to a different portion of the subterranean formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   introducing a treatment fluid comprising a diverter material into a permeable zone of a subterranean formation, wherein the diverter material comprises a composite material of a polyvinyl alcohol and a plasticizer, wherein the diverter material comprises particles having a particle size distribution of about 2 to about 10 U.S. mesh, wherein the diverter material comprises particles having an aspect ratio of 20:1 or less, and wherein the permeable zone is part of a wellbore that is permeated or penetrated by fractures and fissures; and
   allowing the diverter material to at least partially divert at least a portion of a treatment fluid to a different portion of the subterranean formation.

2. The method of claim 1, wherein the diverter material is introduced using one or more pumps.

3. The method of claim 1, wherein the treatment fluid further comprises a carrier fluid.

4. The method of claim 2, wherein the carrier fluid comprises at least one carrier fluid selected from the group consisting of fresh water, salt water, deionized water, brine water, seawater, and any combination thereof.

5. The method of claim 1, wherein the plasticizer comprises at least one plasticizer selected from the group consisting of glycol, polyethylene glycol, polypropylene glycol, a fatty acid ester, a glycolide monomer, a citric acid ester, epoxidized oil, adipate ester, azaleate ester, acetylated coconut oil, and any combination thereof.

6. The method of claim 1, wherein the diverter material has an aspect ratio of 5:1 or less.

7. The method of claim 1, wherein the diverter material has a particle size distribution of about 4 to about 8 U.S. mesh.

8. The method of claim 1, wherein a shape of the diverter material comprises at least one shape selected from the group consisting of platelets, shavings, flakes, ribbons, rods, strips, spheroids, toroids, stars, sheets, cylinders, beads, cylindrical beads, cubes, pellets, tablets, any other physical shape, and any combination thereof.

9. The method of claim 1, wherein the shape of the diverter material comprises cylindrical particles.

10. The method of claim 1, further comprising allowing the diverter material to at least partially dissolve.

11. A method comprising:
    introducing a treatment fluid comprising a diverter material into a permeable zone of a subterranean formation, wherein the diverter material comprises a composite material of a polyvinyl alcohol and a plasticizer, wherein the diverter material comprises particles having an aspect ratio of 20:1 or less, and wherein the permeable zone is part of a wellbore that is permeated or penetrated by fractures and fissures; and
    allowing the diverter material to at least partially divert at least a portion of a treatment fluid to a different portion of the subterranean formation.

12. The method of claim 11, wherein the diverter material is introduced using one or more pumps.

13. The method of claim 11, wherein the treatment fluid further comprises a carrier fluid.

14. The method of claim 11, wherein the plasticizer comprises at least one plasticizer selected from the group consisting of glycol, polyethylene glycol, polypropylene glycol, a fatty acid ester, a glycolide monomer, a citric acid ester, epoxidized oil, adipate ester, azaleate ester, acetylated coconut oil, and any combination thereof.

15. The method of claim 11, wherein the diverter material has a particle size distribution of about 4 to 8 U.S. mesh.

16. The method of claim 11, wherein a shape of the diverter material comprises at least one shape selected from the group consisting of platelets, shavings, flakes, ribbons, rods, strips, spheroids, toroids, stars, sheets, cylinders, beads, cylindrical beads, cubes, pellets, tablets, any other physical shape, and any combination thereof.

17. The method of claim 11, further comprising allowing the diverter material to at least partially dissolve.

18. A wellbore treatment fluid comprising:
    an aqueous carrier fluid; and
    a diverter material, wherein the diverter comprises a composite material of a polyvinyl alcohol and a plasticizer, wherein the diverter material comprises particles having a particle size distribution of about 2 to about 10 U.S. mesh, and wherein the diverter material comprises particles having an aspect ratio of 20:1 or less.

19. The wellbore treatment fluid of claim 18, wherein the aqueous carrier fluid comprises at least one aqueous carrier fluid selected from the group consisting of fresh water, salt water, deionized water, brine water, seawater, and any combination thereof.

20. The wellbore treatment fluid of claim 18, wherein the diverter material is present in the treatment fluid in an amount from about 0.01 to about 5.5 pounds of diverter material per gallon of carrier fluid.

* * * * *